(12) United States Patent
Ibrahim et al.

(10) Patent No.: US 10,071,665 B2
(45) Date of Patent: Sep. 11, 2018

(54) GRAB HANDLE ASSEMBLY FOR USE IN A VEHICLE

(71) Applicant: Honda Motor Co., Ltd., Tokyo (JP)

(72) Inventors: Christina M. Ibrahim, Ostrander, OH (US); Johnny T. Nguyen, Santa Ana, CA (US); Rafael E. Velasco, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/336,291

(22) Filed: Oct. 27, 2016

(65) Prior Publication Data

US 2018/0118072 A1    May 3, 2018

(51) Int. Cl.
 *B60N 3/02* (2006.01)
 *B60R 21/215* (2011.01)
 *H04R 1/02* (2006.01)

(52) U.S. Cl.
 CPC ............... *B60N 3/02* (2013.01); *B60N 3/026* (2013.01); *B60R 21/215* (2013.01); *H04R 1/028* (2013.01); *H04R 2499/13* (2013.01)

(58) Field of Classification Search
 CPC . B60R 11/0217; B60R 21/232; B60R 21/213; B60N 3/026; B60N 3/023; H04R 1/026; H04R 1/025
 See application file for complete search history.

(56) References Cited

U.S. PATENT DOCUMENTS

| | | | | |
|---|---|---|---|---|
| 5,095,659 A * | 3/1992 | Benoit | ................... | B60J 5/0416 292/141 |
| 5,519,917 A * | 5/1996 | Cordonnier | ............ | B60N 3/026 16/422 |
| 5,527,587 A | 6/1996 | Bahm | | |
| 5,904,002 A * | 5/1999 | Emerling | ............... | B60J 5/0406 49/502 |
| 6,076,233 A * | 6/2000 | Sasaki | .................... | B60N 3/026 16/438 |
| 6,139,088 A * | 10/2000 | Okamoto | ............... | B60J 5/0416 296/146.1 |
| 6,449,907 B2 * | 9/2002 | Nishikawa | ............. | B60J 5/0416 296/146.7 |
| 6,474,721 B2 * | 11/2002 | Nishikawa | ............. | B60J 5/0416 296/146.6 |
| 6,485,048 B2 * | 11/2002 | Tajima | ................. | B60N 2/4876 280/728.2 |
| 6,493,919 B2 * | 12/2002 | Morrison | ............... | B60J 5/0416 29/281.4 |
| 6,499,782 B2 * | 12/2002 | Kwon | .................... | B60N 3/026 24/293 |

(Continued)

FOREIGN PATENT DOCUMENTS

| | | | | |
|---|---|---|---|---|
| DE | | 1555865 A1 * | 2/1971 | ............ B60J 3/0213 |
| DE | 102011101164 A1 | | 11/2012 | |

(Continued)

*Primary Examiner* — Nicole T Verley
(74) *Attorney, Agent, or Firm* — Honda Patents & Technologies North America, LLC

(57) ABSTRACT

A grab handle assembly for use in a vehicle includes a bracket for mounting on a vehicle frame, a speaker assembly mounted on the bracket and a grab handle mounted on the bracket. The speaker assembly is located between the bracket and the grab handle.

19 Claims, 8 Drawing Sheets

(56) References Cited

U.S. PATENT DOCUMENTS

| | | | | |
|---|---|---|---|---|
| 6,802,544 B1* | 10/2004 | Lane | ............... | E05B 85/16 292/168 |
| 6,836,932 B2* | 1/2005 | Yamamoto | ............ | B60N 3/023 16/110.1 |
| 6,857,688 B2* | 2/2005 | Morrison | ............... | B60J 5/0416 296/146.6 |
| 6,869,119 B2* | 3/2005 | Ito | ......................... | B60N 3/026 296/1.02 |
| 6,969,100 B2* | 11/2005 | Totani | ................... | B60N 3/023 16/110.1 |
| 7,104,675 B2* | 9/2006 | Chen | ..................... | B60Q 3/267 362/488 |
| 7,191,493 B2* | 3/2007 | Vanderpool | ........... | B60N 3/026 16/412 |
| 7,270,359 B2 | 9/2007 | Sparks et al. | | |
| 7,410,204 B2* | 8/2008 | Koa | ...................... | B60J 5/0416 296/152 |
| 7,559,592 B2* | 7/2009 | Yamagiwa | ............ | B60N 3/026 296/1.02 |
| 7,607,708 B2* | 10/2009 | Benkler | ................ | B60N 3/026 296/1.02 |
| 7,712,775 B2* | 5/2010 | Sato | ................... | B60R 13/0206 280/728.2 |
| 7,850,197 B2* | 12/2010 | Zucal | ................... | B60N 3/026 280/728.3 |
| 7,896,417 B2* | 3/2011 | Gupta | .................. | B60R 21/055 296/1.02 |
| 8,317,221 B2* | 11/2012 | Hemingway | ......... | B60N 3/026 280/728.2 |
| 8,439,392 B2* | 5/2013 | Westenberger | ....... | B60R 21/213 280/728.2 |
| 8,641,083 B2* | 2/2014 | Nakamura | ............ | B60N 3/026 280/728.2 |
| 8,827,516 B2* | 9/2014 | Stakoe | .................. | B60Q 3/267 362/488 |
| 8,925,960 B2* | 1/2015 | Uchida | ................. | B60N 3/026 280/728.3 |
| 8,931,818 B2* | 1/2015 | Inoue | .................... | B60N 3/026 296/1.02 |
| 9,376,080 B1* | 6/2016 | Martinez | ............... | B60R 13/025 |
| 9,616,792 B2* | 4/2017 | Claire | ..................... | B60N 3/02 |
| 9,630,585 B2* | 4/2017 | Tsumura | ............... | B60R 21/213 |
| 9,651,193 B1* | 5/2017 | Taberner | ............... | F16B 41/005 |
| 9,840,221 B2* | 12/2017 | England | ................ | B60R 21/213 |
| 2001/0032377 A1* | 10/2001 | Lubera | .................. | B60N 3/026 24/293 |
| 2001/0046426 A1* | 11/2001 | Lubera | .................. | B60N 3/026 411/182 |
| 2002/0146116 A1 | 10/2002 | Choi | | |
| 2003/0013504 A1 | 1/2003 | Park et al. | | |
| 2005/0189789 A1* | 9/2005 | Schmidt | ................ | B60J 5/0418 296/187.12 |
| 2006/0086049 A1* | 4/2006 | Mayenburg | ........... | B60J 5/0416 49/349 |
| 2006/0239495 A1* | 10/2006 | Abe | ....................... | H04R 1/025 381/386 |
| 2007/0052220 A1* | 3/2007 | Hidaka | ................. | B60R 21/213 280/730.2 |
| 2007/0296185 A1* | 12/2007 | Hidaka | ................. | B60R 21/213 280/728.2 |
| 2009/0147528 A1* | 6/2009 | Wang | ................... | B60Q 1/2669 362/501 |
| 2012/0098294 A1* | 4/2012 | Dancasius | ........... | B60R 13/0243 296/146.6 |

FOREIGN PATENT DOCUMENTS

| | | | | |
|---|---|---|---|---|
| DE | 102012024041 A1 * | 6/2014 | ............ | B60N 3/026 |
| DE | 102014115221 A1 * | 6/2015 | ............ | B60N 3/023 |
| FR | 3024852 A1 * | 2/2016 | ............ | B60N 3/026 |
| GB | 2333924 A | 4/1999 | | |
| JP | 2002370586 A | 12/2002 | | |
| JP | 2003137012 A * | 5/2003 | ............ | B60N 3/026 |
| JP | 2008150031 A * | 7/2008 | .......... | B60R 21/055 |
| JP | 2009046001 A | 3/2009 | | |
| JP | 2014097746 A * | 5/2014 | ............ | B60N 3/023 |
| WO | WO-2014077127 A1 * | 5/2014 | ............ | B60N 3/023 |
| WO | WO-2014077128 A1 * | 5/2014 | .......... | B60R 13/025 |
| WO | WO-2017174282 A1 * | 10/2017 | ............ | B60N 3/026 |

* cited by examiner

GRAB HANDLE ASSEMBLY FOR USE IN A VEHICLE

TECHNICAL FIELD

The present disclosure relates to a grab handle assembly for use in a vehicle. More particularly, the present disclosure relates to a grab handle assembly integrated with a speaker.

BACKGROUND

A grab handle in a vehicle is generally known to include a handle structure for a user to grasp during entry to and egress from the vehicle, or to steady the user during vehicle maneuvering. Because the grab handle is located near passenger's head, it is sometimes integrated with a speaker, which is used as a personal speaker. It is known to provide a grab handle which includes a speaker and a microphone on the surface of it for a hands free phone unit of a vehicle. This allows a passenger to communicate with a caller without being heard by the other passenger in the vehicle because the speaker and the microphone are close to the passenger.

However, this speaker may be useful enough for use as a hands free phone unit but for a speaker of an in-vehicle audio system such as CD player, DVD player, radio or as such. If the speaker is installed on the surface of the grab handle, that structure makes it difficult to include a speaker large enough for a passenger to enjoy good sound such as music.

Accordingly, it would be advantageous to install a speaker on the grab handle that is large enough without narrowing room between the grab handle and passenger's head.

SUMMARY

In accordance with one embodiment, a grab handle assembly for use in vehicle may include a bracket for mounting on a vehicle frame, a speaker assembly mounted on the bracket, a grab handle mounted on the bracket. The speaker assembly may be located between the bracket and the grab handle.

In accordance with another embodiment, a grab handle assembly may include a first bracket, a second bracket, a grab handle mounted on the first bracket and the second bracket and a speaker assembly mounted on the first bracket and the second bracket. The speaker assembly may include a speaker portion and the speaker portion may be disposed between the first bracket and the second bracket.

In accordance with yet another embodiment, a method for installing a grab handle assembly to a vehicle may include steps of mounting a bracket on a vehicle frame, mounting a speaker assembly on the bracket and mounting a grab handle on the bracket. The speaker assembly may be individually held by a third engaging portion of the speaker assembly engaging with a second engaging portion of the bracket before the grab handle is mounted.

The figures depict various views of the embodiments for purposes of illustration only. One skilled in the art will readily recognize from the following discussion that alternative embodiments of the structures and methods illustrated herein may be employed without departing from the principles of the embodiments described herein.

DETAILED DESCRIPTION

Figure 1:
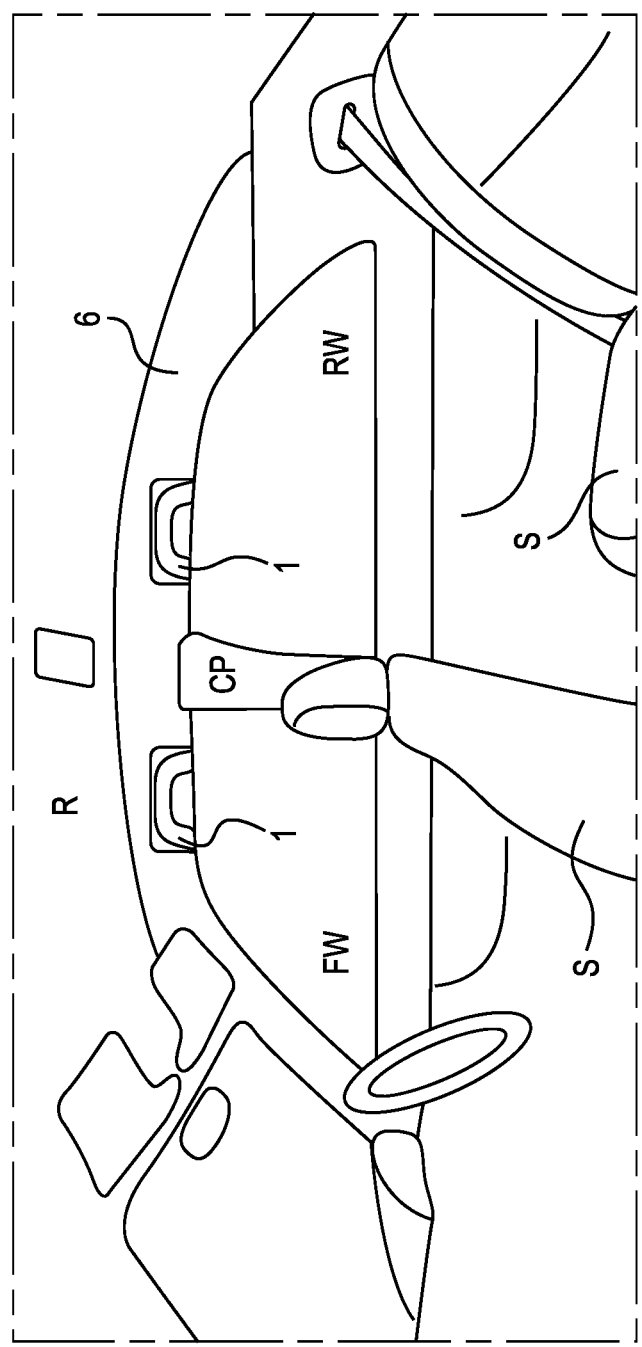
FIG. 1 is a side view of a vehicle interior including a grab handle assembly.
Figure 2:
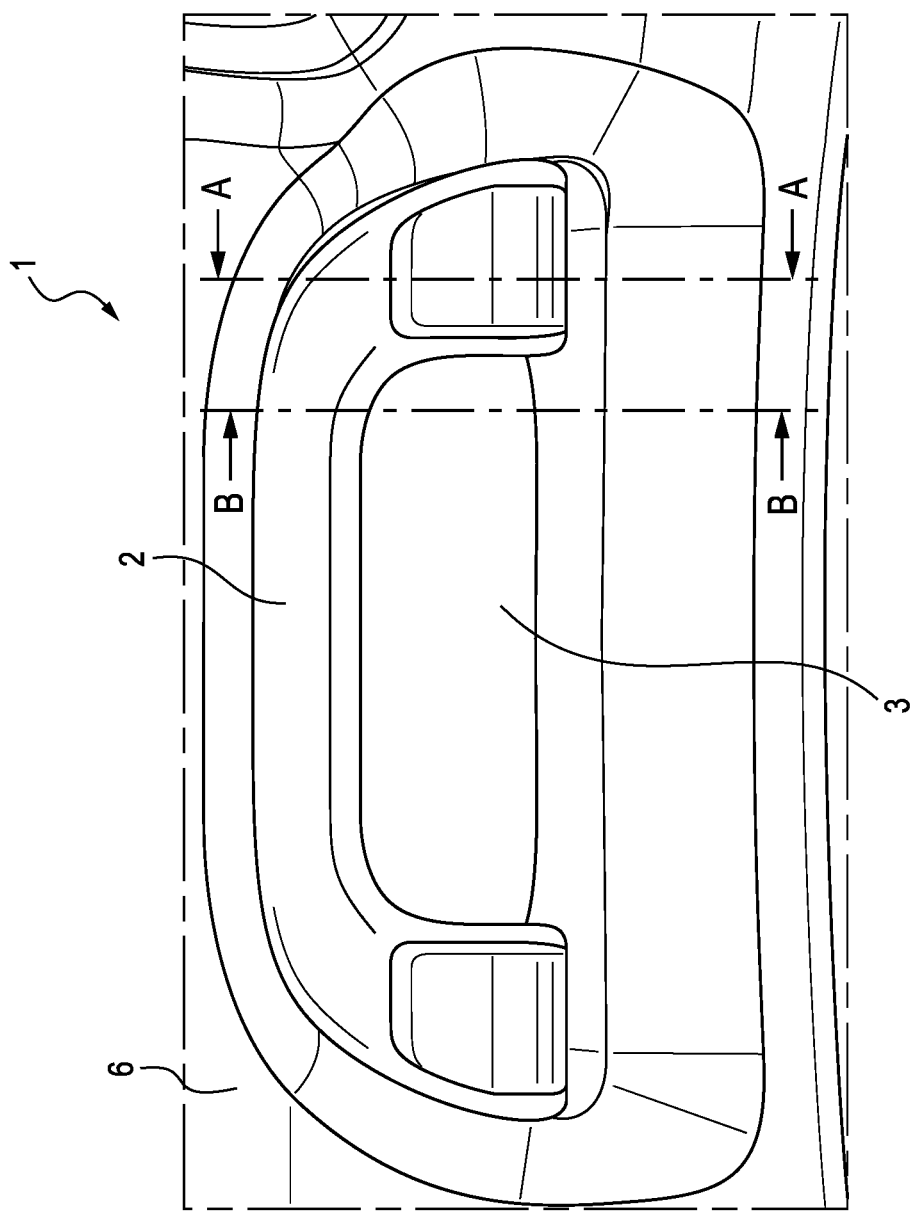
FIG. 2 is a front view of the grab handle assembly of FIG. 1.

FIG. 1 shows a side view of a vehicle interior that includes a grab handle assembly 1 disposed between a roof R and side windows FW/RW. As shown in FIG. 2, a grab handle 2 is mounted on a cover 6 that covers a portion around the grab handle 2 by extending in a longitudinal direction of the vehicle. There is a speaker grille 3 between the cover 6 and the grab handle 2.

Figure 3:
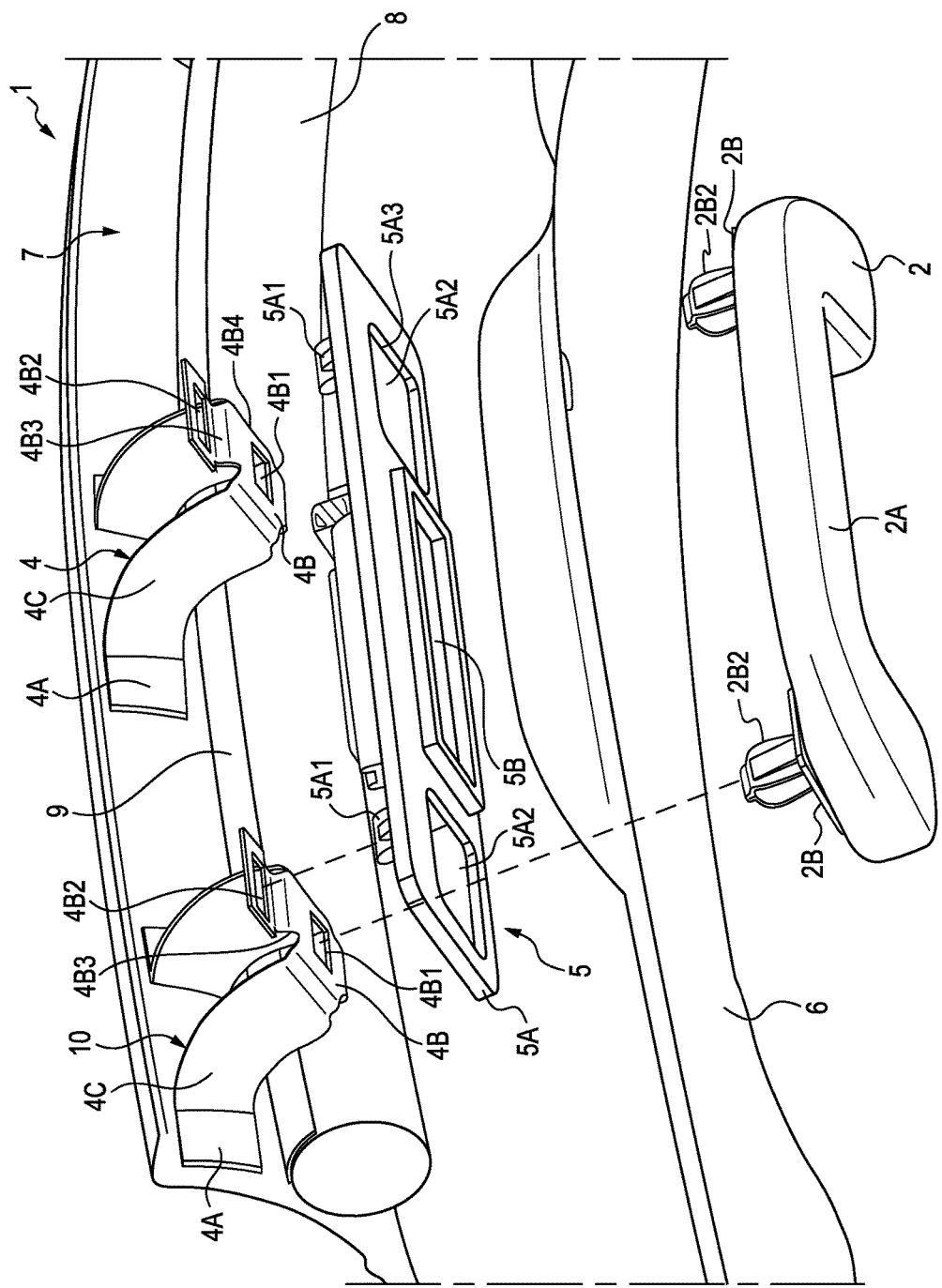
FIG. 3 is an exploded view of the grab handle assembly.
Figure 6:
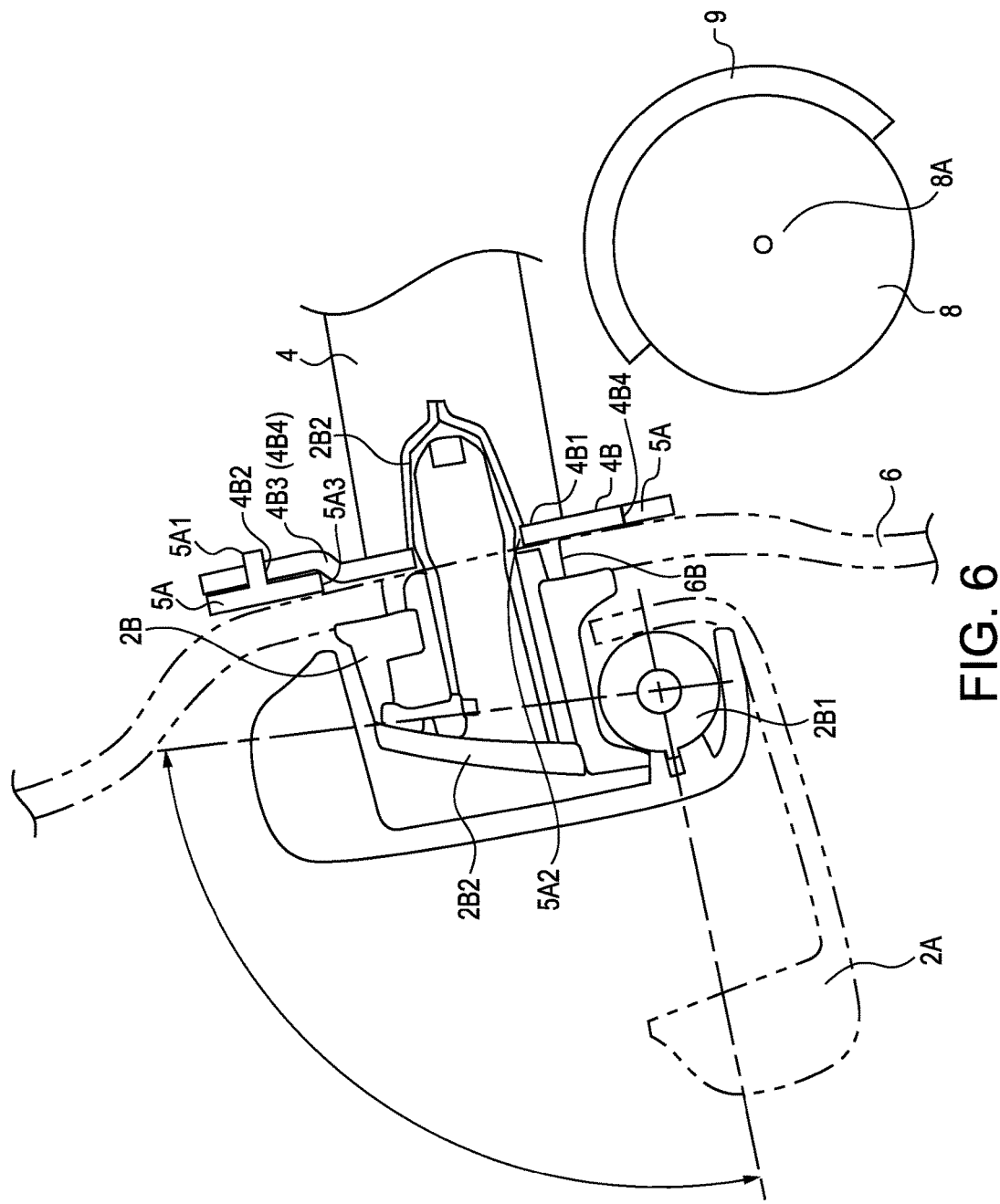
FIG. 6 is a section view A-A of the grab handle assembly of the FIG. 2

FIG. 3 shows an exploded view of the grab handle assembly 1 including a bracket 4, a speaker assembly 5, a cover 6 and a grab handle 2. There may be two brackets 4, 10 attached to a vehicle frame 7 such as a side roof rail by, for example, welding, glue, screw, bolt etc. The brackets 4, 10 are made of steel, aluminum, titanium, resin or the other material strong enough to steady a passenger when grabbed. The brackets 4, 10 include foot portion 4A that is attached to the vehicle frame 7, a mating portion 4B that mates with a fourth engaging portion 5A2 of the speaker assembly 5, which is described later, and a joining portion 4C that connects the foot portion 4A and the mating portion 4B. Referring to FIG. 6, an outer perimeter 4B4 of the mating portion 4B is set so as to fit an inner perimeter 5A3 of the fourth engaging portion 5A2 of the speaker assembly, which is also described later. Referring back to FIG. 3, the mating portion 4B includes a first engaging portion 4B1, such as a hole, engaged with the grab handle 2 and a second engaging portion 4B2, such as a hole, engaged with the speaker assembly 5. Referring to FIG. 6, a part of the mating portion 4B is extended towards an opposite side of a side of a curtain airbag 8 to create the second engaging portion 4B2. The configuration of the mating portion 4B allows the side curtain air bag 8 to deploy without any obstruction. The first engaging portion 4B1 and the second engaging portion 4B2 are connected with a stepped portion 4B3 to make the second engaging portion 4B2 offset from the first engaging portion toward the vehicle frame 7. Referring back to FIG. 3, the joining portion 4C is extended from the foot portion 4A towards a driver seat S or a passenger seat S. The two foot portions 4A are attached to the vehicle frame 7. The foot portions 4A may be mounted on the vehicle frame 7 by welding, glue, bolts, screws etc. as described before.

In the above embodiment, the bracket 4, 10 are mounted on the vehicle frame 7 such as side roof rail, however the brackets 4, 10 may be mounted on any vehicle location suitable to dispose the grab handle 2 such as a ceiling, a pillar, etc. A center pillar located between front side window FW and the rear side window RW (See FIG. 1) is especially useful for vehicles with sliding doors. Because, in such vehicles, a passenger can grab the grab handle installed on the center pillar when getting in and out, and also the grab handle is close to the driver/passenger's head.

Referring to FIG. 3, the speaker assembly 5 includes a base portion 5A and a speaker portion 5B that is connected to an audio device in a wired or wireless manner (not shown). Referring to FIG. 6, the base portion 5A includes a third engaging portion 5A1, such as a protrusion, extending to the bracket 4 to engage with the second engaging portion 4B2 and the fourth engaging portion 5A2 where a grab handle protrusion portion 2B2 penetrates and also the mating portion 4B is mated. The inner perimeter 5A3 of the third engaging portion 5A1 is set so as to fit the outer perimeter 4B4 of the mating portion 4B of the bracket 4. Referring back to FIG. 3, the speaker portion 5B makes sounds based on signal from the audio device. Any known speaker structure can be used as the speaker portion 5B. The speaker assembly 5 is mounted on the two brackets 4, 10 through the third engaging portions 5A1 engaged with the second engaging portion 4B2 of the brackets 4, 10 and by mating the inner perimeter 5A3 of the fourth engaging portion 5A2 with the outer perimeter 4B4 of the mating portion 4B as described above. The speaker portion 5B is located between the two brackets 4, 10. This configuration helps the speaker portion 5B avoid any damage that may be caused by the airbag 8 when the airbag 8 inflates to deploy.

Figure 4:
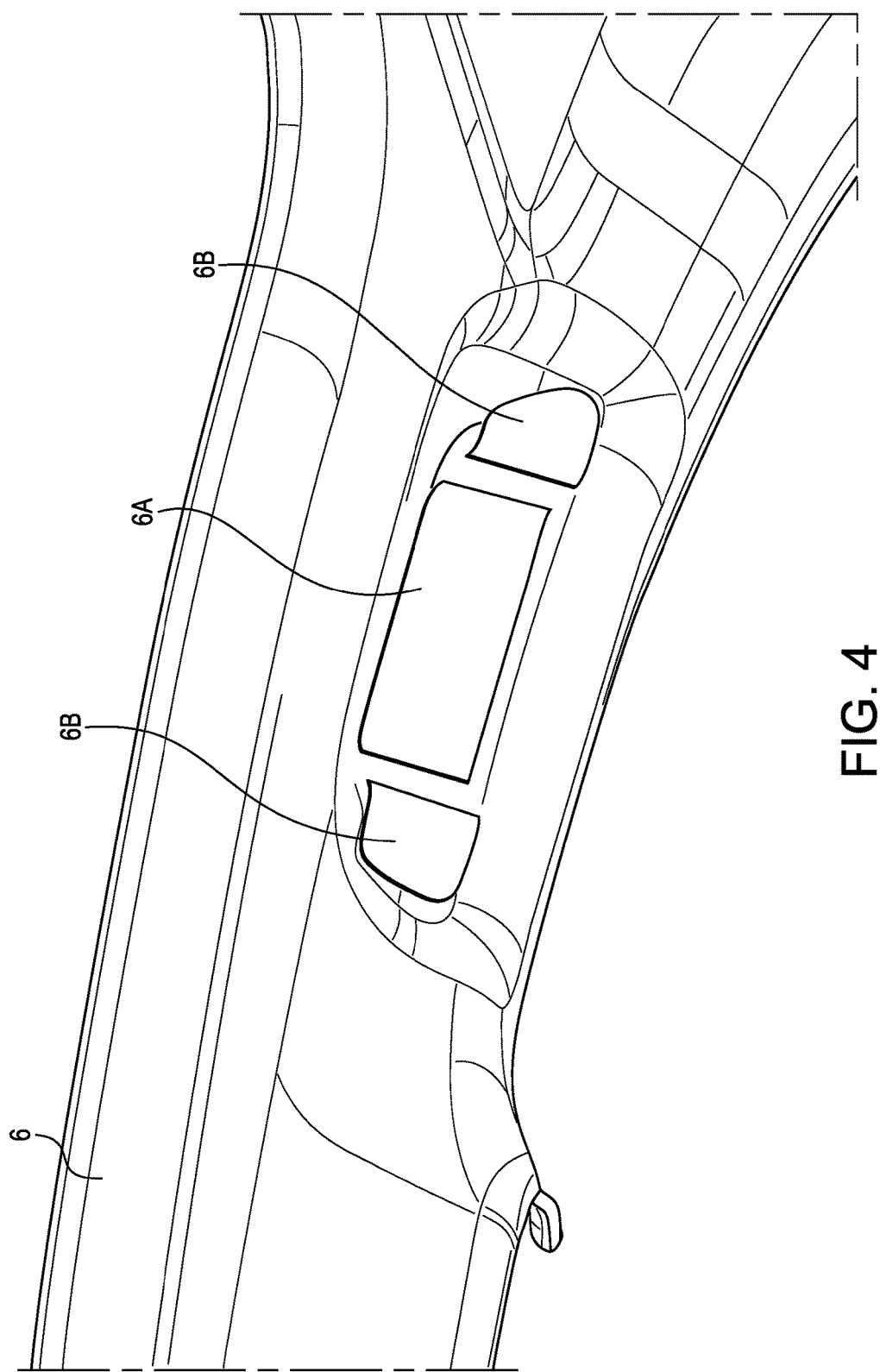
FIG. 4 is a perspective view of a cover.

Referring to FIG. 4, the cover 6 such as a head liner includes a first cut out portion 6A where sound from the speaker portion 5B may pass. The first cut out portion 6A is limited to an area that corresponds to the speaker portion 5B of the speaker assembly 5 shown in FIG. 3. The cover 6 includes the second cut out portions 6B which receives the grab handle protrusion portion 2B2 of the grab handle 2 which is described later (See FIG. 6). The cover 6 is disposed on the speaker assembly 5 and installed on the vehicle frame 7 in well-known manner to function as a part of vehicle interior.

In the above embodiment, the first cut out portion 6A and the second cut out portions 6B are separately created, however the first cut out portion 6A and the second cut out portion 6B may be continuously created.

In the above embodiment, the cover 6 is used to cover the speaker assembly 5, however the cover 6 or cover similar to the cover 6 may be omitted. Or the cover 6 may only cover a part of the interior vehicle other than the speaker assembly.

Figure 5:
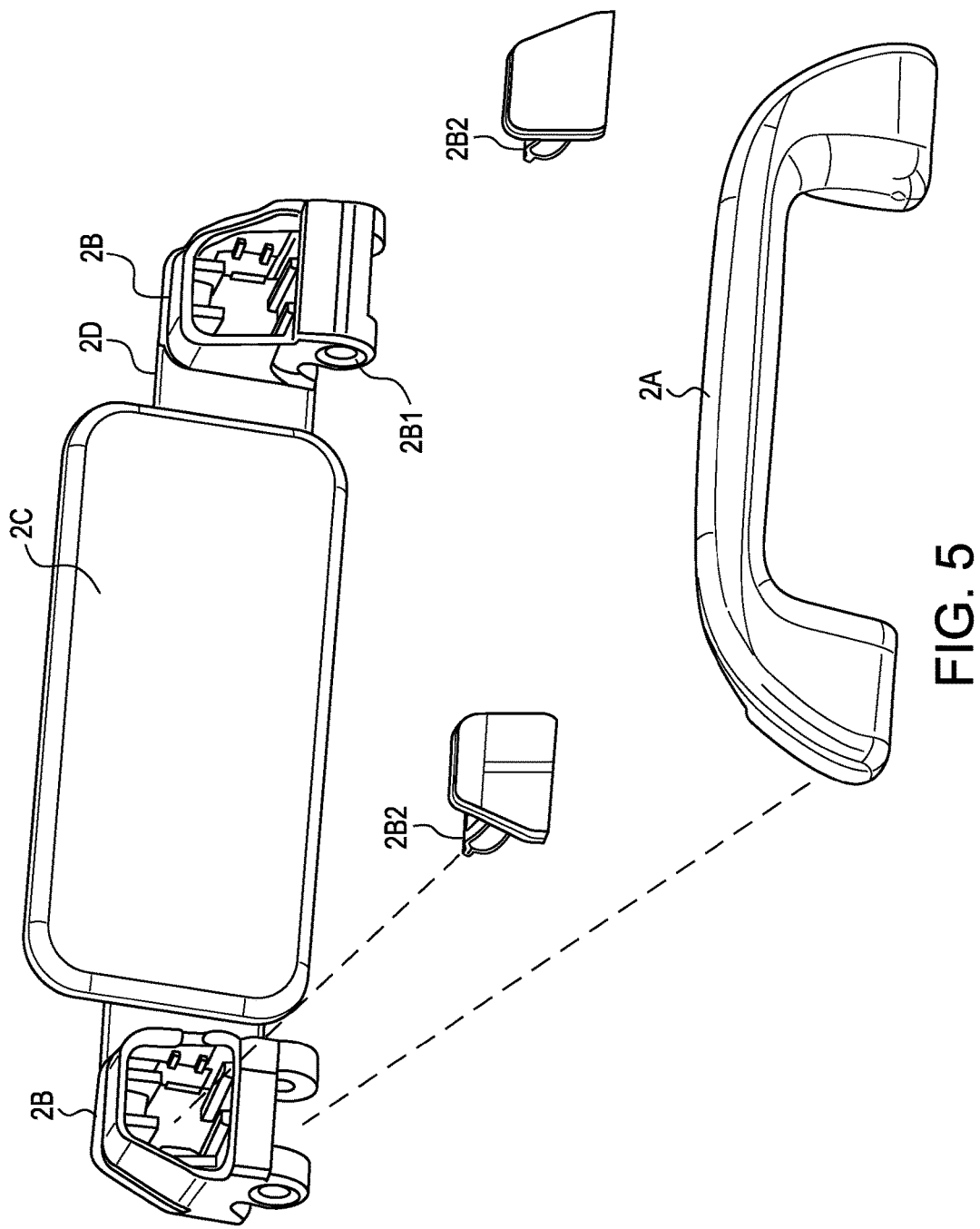
FIG. 5 is an exploded view of a grab handle.
Figure 7:
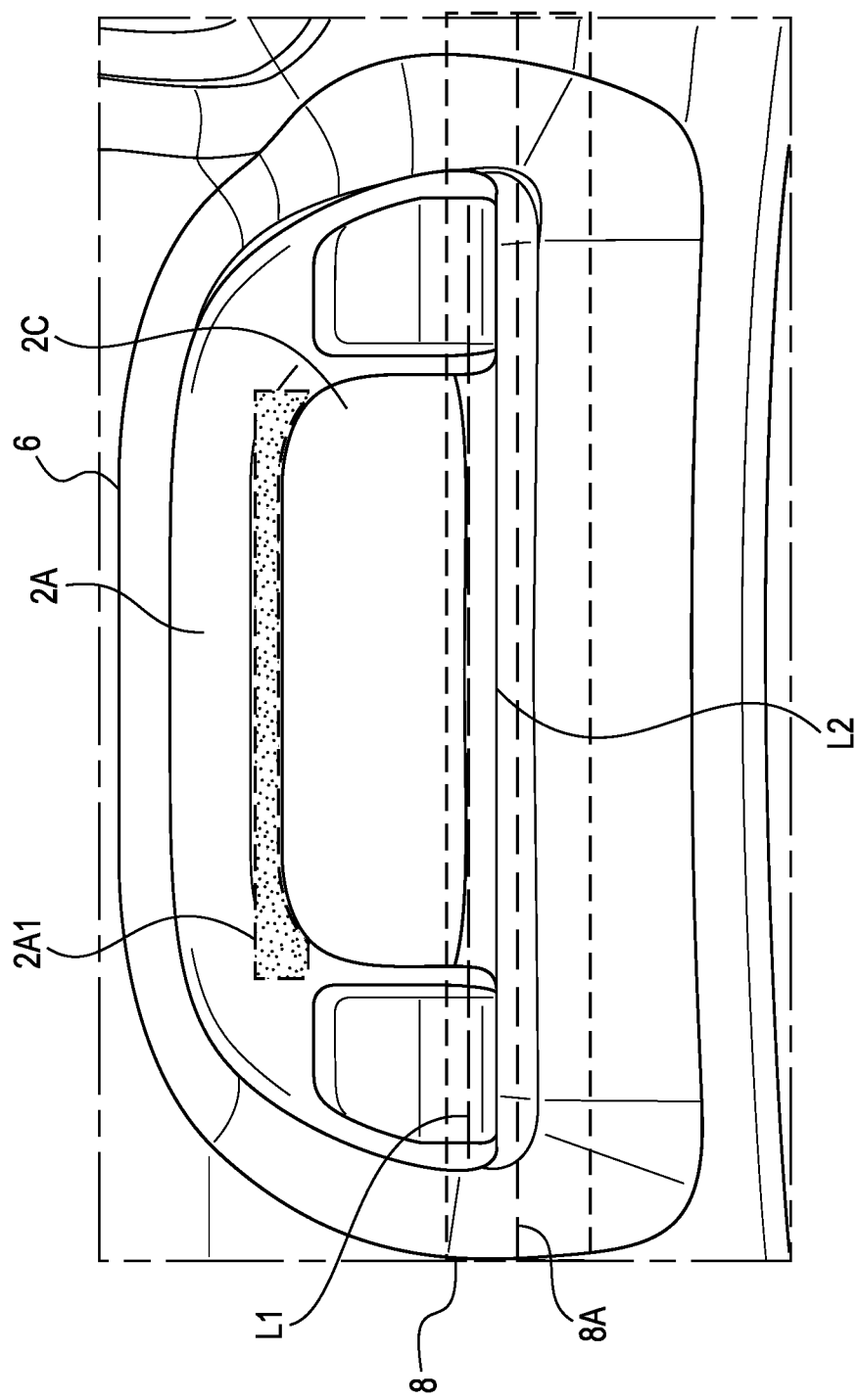
FIG. 7 is a front view of the grab handle.

As shown in FIG. 3 and FIG. 5, the grab handle 2 includes a handle portion 2A, a handle base portion 2B, a speaker grille portion 2C, a connecting portion 2D. The handle portion 2A is connected with the handle base portion 2B at a hinge portion 2B1 and is grabbed by the passenger. Referring to FIG. 6, the handle portion 2A is able to rotate along the hinge portion 2B1 so that the handle portion 2A can be deployed by rotating away from the handle base portion 2B for the passenger to grab the handle portion 2A easily when used, and the handle portion 2A can be folded by rotating along the hinge portion 2B1 towards the handle base portion 2B when not used. Referring to FIG. 3, the handle base portion 2B includes the grab handle protrusion portion 2B2 which is engaged with the first engaging portion 4B1 of the bracket 4 through the second cut out portion 6B of the cover 6 and the fourth engaging portion 5A2 of the speaker assembly 5. Referring to FIG. 5, the speaker grille portion 2C is located between the handle base portions 2B. The speaker grille portion 2C is connected with the two base portions 2B by a connecting portion 2D. The speaker grille portion 2C, the connecting portion 2D and the handle base portion 2B may be integrally molded. In another embodiment, the speaker grille portion 2C, the connecting portion 2D and the handle base portion 2B may be separately molded and then put together by fasteners, glue, double faced tape etc. The speaker grille 2C includes a plurality of sound holes where sound from the speaker assembly 5 may pass. Referring to FIG. 7, the handle portion 2A overlaps with the speaker grille portion 2C at an overlapping portion 2A1 of the handle portion 2A. The overlapping portion 2A1 may include sound holes to prevent the sound from the speaker assembly 5 from being obstructed by the overlapping portion 2A1 as needed.

In the above embodiment, the grab handle 2 is able to rotate along the hinge portion 2B1, however the grab handle 2 that is not rotatable may be also used.

In the above embodiment, the speaker grille portion 2C is installed on the cover 6, however the speaker grille portion 2C may be omitted. In that case, the cut out portion 6C may be function as a speaker grille 2C by creating a plurality of holes where sound from the speaker may pass.

In the above embodiment, the bracket 4 has the first engaging portion 4B1 which is a hole and the grab handle 2 has the protrusion portion 2B2, however the bracket 4 may have a protrusion instead of the hole and the grab handle 2 may have a hole instead of the protrusion.

In the above embodiment, the bracket 4 has the second engaging portion 4B2 which is a hole and the speaker assembly 5 has the third engaging portion 5A1 which is a protrusion, however the bracket 4 may have a protrusion instead of the hole and the speaker assembly 5 may have a hole instead of the protrusion.

Figure 8:
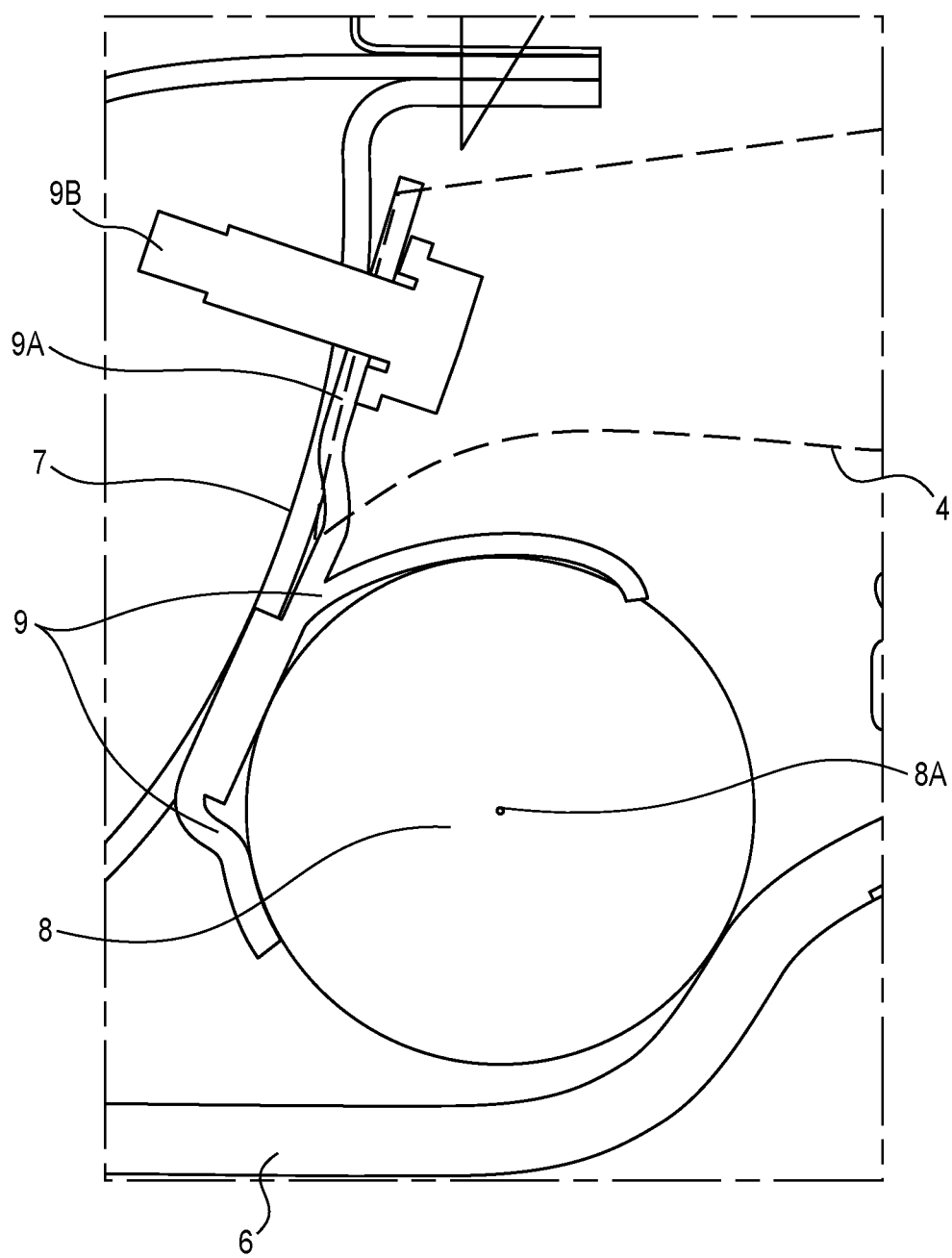
FIG. 8 is a partial section view B-B of the grab handle assembly of the FIG. 2

Referring to FIG. 3 and FIG. 6, optionally, under the brackets 4, 10 there is a side curtain airbag (SCAB) 8 that deploys when the vehicle detects a collision. The side curtain airbag 8 is made of fabric which is rolled up and shaped like a cylinder when installed. The side curtain airbag 8 is partially covered by protective cover 9 extending along the side curtain airbag 8 in a longitudinal direction to prevent damage caused by the brackets 4, 10 touching with the side curtain airbag. The side curtain air bag 8 is installed on the vehicle frame 7 through the protective cover 9 which is attached to the vehicle frame 7 with any fastening method, such as fasteners, glue, double faced tape etc. For example, referring to FIG. 8, the protective cover 9 partially surrounding air bag 8 is attached to a supporting member 9A with a clip 9B. The clip 9B is inserted into the side roof rail 7 through a hole set on the side roof rail 7. When deployed, the side curtain airbag 8 rolls out and extends below to cover the vehicle side window FW/RW like a curtain. As shown in FIG. 7, an airbag axis 8A or a centerline of the cylindrical airbag 8 is located under a first lower end line L1 of the base portion 5A of the speaker assembly 5 and a second lower end line L2 of the handle portion 2A of the grab handle 2. This allows the side curtain airbag to deploy without any obstruction.

In the above embodiment, the side curtain airbag 8 is installed, however the grab handle assembly 1 may be applied to a vehicle without the side curtain airbag.

The grab handle assembly 1 is assembled as follows. First, after the side curtain airbag 8 is installed on the vehicle frame 7, the two brackets 4, 10 are attached to the vehicle frame 7. Secondly, the speaker assembly 5 is individually disposed and held on the mating portion 4B by mating the mating portion 4B with the fourth engaging portion 5A2 and also by engaging the third engaging portion portions 5A1 with the second engaging portion 4B2. Thirdly, the cover 6 is set on the speaker assembly 5 and attached to the vehicle frame 7. Finally, the grab handle protrusion portion 2B2 of the grab handle 2 is inserted into the first engaging portion 4B1 of the brackets 4, 10 through the second cut out portion 6B and the fourth engaging portion 5A2. Installing the grab handle 2 especially the handle base portion 2B pushes the cover 6 and then the cover 6 pushes the base portion 5A of the speaker assembly 5 to secure the speaker assembly 5 that is individually held before.

The foregoing description of embodiments and examples has been presented for purposes of illustration and description. It is not intended to be exhaustive or to limit the invention to the forms described. Numerous modifications are possible in light of the above teachings. Some of those modifications have been discussed and others will be understood by those skilled in the art. The embodiments were chosen and described in order to best illustrate certain principles and various embodiments as are suited to the particular use contemplated. The scope of the invention is, of course, not limited to the examples or embodiments set forth herein, but can be employed in any number of applications and equivalent devices by those of ordinary skill in the art. Rather it is hereby intended the scope of the invention be defined by the claims appended hereto.

What is claimed is:

1. A grab handle assembly for use in a vehicle comprising: a bracket for mounting on a vehicle frame, a speaker assembly mounted on the bracket, and a grab handle mounted on the bracket, wherein the speaker assembly is located between the bracket and the grab handle, wherein the bracket includes a first engaging portion that engages with a part of the grab handle to be fixed on the bracket, the bracket further comprising a mating portion surrounding the first engaging portion, and wherein an outer perimeter of the mating portion engages with an inner perimeter of a fourth engaging portion on the speaker assembly.

2. A grab handle assembly according to claim 1 wherein the bracket includes a second engaging portion, wherein the second engaging portion engages with a third engaging portion on the speaker assembly to be fixed on the bracket.

3. A grab handle assembly according to claim 2 wherein the second engaging portion is offset from the first engaging portion towards the vehicle frame.

4. A grab handle assembly according to claim 2 further comprising an airbag device extending in a longitudinal direction of the vehicle under the bracket, wherein the second engaging portion is located on the opposite side of the airbag.

5. A grab handle assembly according to claim 1 further comprising an airbag extending in a longitudinal direction of the vehicle under the bracket, a protective cover that covers at least a part of the air bag, wherein the protective cover is located between the bracket and the airbag.

6. A grab handle assembly according to claim 1 wherein the grab handle is integrated with a speaker grille.

7. A grab handle assembly according to claim 6 wherein the grab handle includes a base portion to support a handle portion which a user grabs and the speaker grille is connected with the base portion.

8. A grab handle assembly according to claim 7 wherein the handle portion includes an overlapping portion which overlaps with a part of the speaker grille and the handle portion includes a plurality of holes at the overlapping portion.

9. A grab handle assembly according to claim 1 further comprising: an air bag extending in the longitudinal direction of the vehicle, wherein the airbag is formed of a cylinder including a centerline extending in a longitudinal direction of the air bag, wherein a lower end of the speaker assembly and/or a lower end of the grab handle is/are located above the centerline of the airbag.

10. A grab handle assembly according to claim 1 wherein the grab handle is deployed when it is used by a passenger or a driver and the grab handle is folded when it is not used by a passenger or a driver.

11. A grab handle assembly device comprising: a first bracket, a second bracket, a grab handle mounted on the first bracket and the second bracket and a speaker assembly mounted on the first bracket and the second bracket wherein the speaker assembly includes a speaker portion and the speaker portion is disposed between the first bracket and the second bracket.

12. A grab handle assembly according to claim 11 further comprising an airbag installed under the first bracket and the second bracket, wherein the airbag extends along the first bracket and the second bracket in a longitudinal direction of the vehicle.

13. A grab handle assembly according to claim 12 further comprising a protective cover partially covering the air bag, wherein the protective cover is located between the airbag and the first bracket and the second bracket and the protective cover extends along the first bracket and the second bracket in a longitudinal direction of the vehicle.

14. A grab handle assembly according to claim 11 wherein the speaker assembly further includes two fourth engaging portions engaged with the first bracket and the second bracket respectively.

15. A grab handle assembly according to claim 14 wherein the speaker portion is located between the two fourth engaging portions.

16. A grab handle assembly according to claim 11 wherein the speaker portion is disposed between the first bracket and the second bracket in a longitudinal direction of the grab handle.

17. A grab handle assembly according to claim 11 wherein the first bracket and the second bracket are mounted on a vehicle frame and are disposed in a longitudinal direction of the grab handle.

18. A grab handle assembly according to claim 11 wherein the first bracket is spaced apart from the second bracket, and wherein the grab handle comprises a first handle base portion on one end of the grab handle mounted on the first bracket, and a second handle base portion on an opposite end of the grab handle mounted on the second bracket, and a handle portion extends between the first handle base portion and the second handle base portion, and wherein the speaker portion is disposed between the first handle base portion and the second handle base portion.

19. A grab handle assembly for use in a vehicle comprising:
a bracket for mounting on a vehicle frame, a speaker assembly mounted on the bracket, and a grab handle mounted on the bracket, wherein the speaker assembly is located between the bracket and the grab handle, wherein the bracket includes a second engaging portion, wherein the second engaging portion engages with a third engaging portion on the speaker assembly to be fixed on the bracket, and further comprising an airbag device extending in a longitudinal direction of the vehicle under the bracket, wherein the second engaging portion is located on a side of the bracket opposite the airbag.

* * * * *